United States Patent [19]
Lambert

[11] 3,751,982
[45] Aug. 14, 1973

[54] FLUID FLOW METER HEAD AND SYSTEM USING SAME

[76] Inventor: Robert R. Lambert, 442 W. Leadora, Glendora, Calif. 91740

[22] Filed: May 3, 1971
[21] Appl. No.: 139,520

[52] U.S. Cl. .................................. 73/212
[51] Int. Cl. .................................. G01p 5/16
[58] Field of Search .......................... 73/212

[56] References Cited
UNITED STATES PATENTS

| | | |
|---|---|---|
| 1,508,017 | 9/1924 | Greve .................... 73/212 |
| 1,250,238 | 12/1917 | Spitzglass ................ 73/212 |
| 3,058,305 | 10/1962 | Leigh, Jr. ................ 73/212 |
| 1,192,761 | 7/1916 | Dodge .................... 73/212 |
| 1,560,664 | 11/1925 | Cole ..................... 73/212 |
| 886,255 | 4/1908 | Sargent .................. 73/212 |
| 3,564,915 | 2/1971 | Tomota et al. ............ 73/194 |
| 3,646,811 | 3/1972 | De Leo et al. ............ 73/182 |

Primary Examiner—Herbert Goldstein
Attorney—Miketta, Glenny, Poms & Smith

[57] ABSTRACT

The fluid flow meter head for installation in a duct to measure the fluid flow therein and thereafter to control the fluid flow rate therein, includes an elongated hollow tubular member mounted in the flow of fliud in the duct, said member having spaced walls extending rearwardly therefrom to create a low pressure spaced therebetween, a central wall therein dividing the hollow member into two separate chambers, a series of axially spaced openings in the member facing the flow of fliud and opening into one of the chambers to provide a total pressure sensing chamber, a series of spaced openings in the member facing across the flow of fluid and opening to the second chamber to provide a static pressure sensing chamber, and fluid connecting means from each chamber to a means for measuring differential pressure to provide an indication of the air flow and to control the air flow rate.

7 Claims, 5 Drawing Figures

PATENTED AUG 14 1973   3,751,982
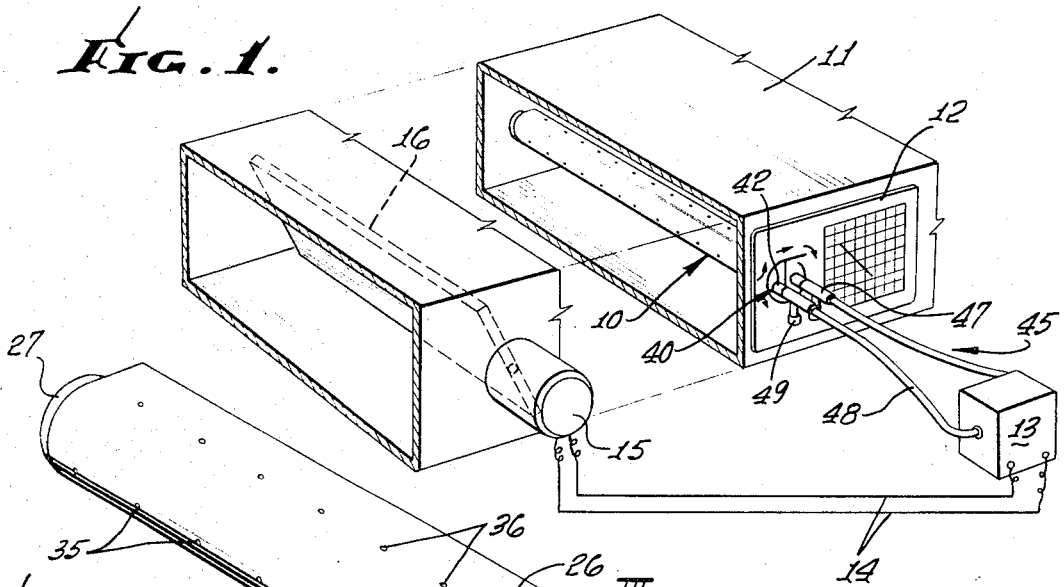
FIG.1.
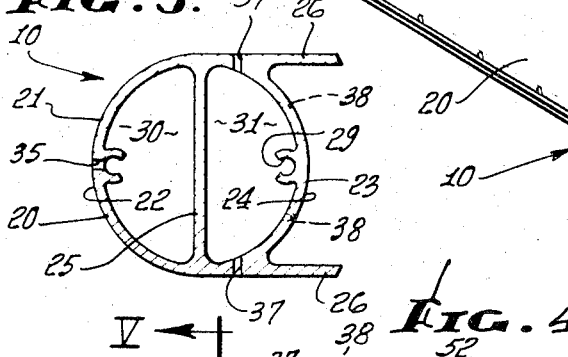
FIG.3.   FIG.2.
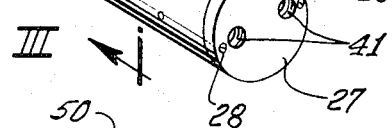
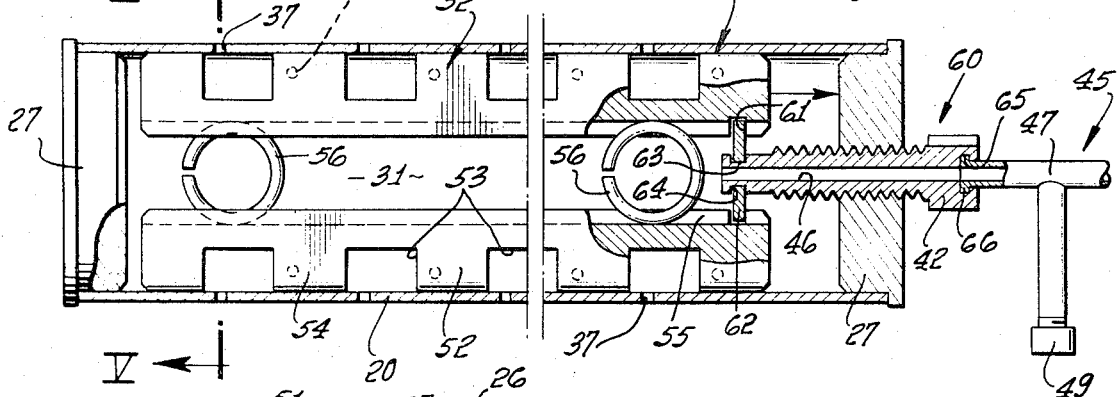
FIG.4.
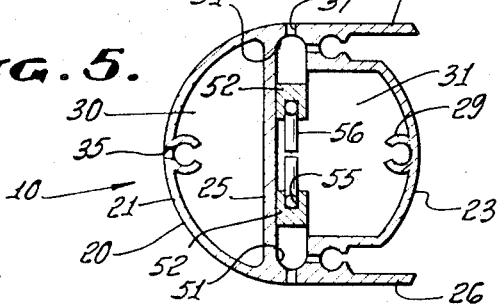
FIG.5.
INVENTOR.
ROBERT R. LAMBERT
BY
Mikulla, Jenny, Pone & Smith
ATTORNEYS.

FLUID FLOW METER HEAD AND SYSTEM USING SAME

BACKGROUND OF THE INVENTION

This invention relates to fluid flow sensing apparatus and more particularly to such an apparatus for use in sensing air flow rates at low pressures and for connection to a means for controlling such air flow.

Air flow meter heads of the type which is the subject of this patent application were first disclosed in my co-pending patent application, Ser. No. 814,498, filed Mar. 17, 1969, now abandoned entitled "Apparatus for Sensing Volumetric Rate of Air Flow." In my later co-pending patent application, Serial No. 114,539 filed Feb. 11, 1971 entitled "Universal Sensing Apparatus for Sensing Volumetric Rate of Fluid Flow," an improved air flow meter head was disclosed. The air flow meter head of this application is an improvement in the heads of the two previous applications to provide a unitary, more easily installed, dependable and less expensive air flow meter head having the capability of sensing a pressure differential thereacross in even low air flow rate conditions to operate means for controlling such air flow.

BRIEF DESCRIPTION OF THE INVENTION

Therefore it is the primary object of this invention to provide a novel unitary air flow meter head and system therefor.

Other and additional objects of this invention are to provide such an air flow meter and system which is easily manufactured, which is adaptable to be mounted in any size duct, which is easily installed in any size duct, which gives a greater fluid pressure differential than other such heads to facilitate the operation of duct flow controls, which senses static pressure and/or senses a pressure lower that static pressure alternatively, to provide a check on the accuracy of the readings of the measuring means and which can be changed from sensing static pressure to sensing a pressure lower than static pressure even when the head is mounted in the duct.

Generally stated, the flow meter head according to this invention includes a single hollow tubular member having a wall dividing the hollow into the separate chambers, said member having a series of axially spaced openings from a first of said chambers through the member to open facing forwardly and having a series of axially spaced openings from the second of said chambers through the member to open facing other than forwardly, the sum of the cross-sectional areas of each series of openings being less than the cross-sectional area of the chamber associated therewith, means mounting the member in the path of fluid flow with the forwardly facing openings facing the flow of fluid to provide a total pressure sensing chamber and the other opening facing other than towards the flow of fluid to provide a low pressure sensing chamber and means for measuring differential fluid pressure. The other openings may face rearwardly or face at right angles to the forward direction to provide a static pressure sensing chamber. The head may include a member with two open ended cavities closed by end caps, and with rearwardly extending spaced walls. Both sets of other openings may be provided in each member and a selecting means will be provided for alternatively selecting one or the other of the sets of other openings. The selecting means may have moving means for moving the selecting means between positions when the head is mounted in the duct.

BRIEF DESCRIPTION OF THE DRAWINGS

FIG. 1 is a fragmentary perspective view of a portion of an air duct having mounted therein, an air flow meter head, according to this invention, which operates a differential pressure sensing means to control a vane in the duct, upstream from the head;

FIG. 2 is an enlarged perspective view of the air flow meter head of FIG. 1;

FIG. 3 is an enlarged end cross-sectional view taken along the plane III—III of FIG. 2;

FIG. 4 is a side cross-sectional view of an alternative preferred embodiment of the air flow meter head, according to this invention, with the selecting means thereof shown in a position to opening the vertical set of openings; and FIG. 5 is an end cross-sectional view taken along the plane V—V of FIG. 4.

DETAILED DESCRIPTION OF THE PREFERRED EMBODIMENT

Referring now to the drawings and particularly to FIG. 1, the fluid flow meter head according to this invention is generally denoted by the numeral 10. The fluid flow meter head 10 is illustratively shown mounted in the right end of a short section of rectangular duct 11. A templet 12, as explained in my previous applications, is provided on the side wall of the duct to indicate the proper location of the head 10 in the duct 11. The rectangular duct 11 is merely illustrative of the many shapes of ducts in which the fluid flow meter head 10 may be mounted.

As will be more fully explained later, the air flow meter head 10 is fluidly connected to a means 13 for measuring differential fluid pressure which is illustratively shown as a transducer which generates an electrical signal in response to a differential fluid pressure being applied thereto. The means 13 could be an instrument which produces a pnuematic or other types of transmittable signal if so desired. Transmission lines 14, in this illustration, electrical wires, carry the signal produced by the means 13 to a motor means 15. The motor means 15 are operably connected to a vane means 16 located across the left end of the duct 11 and up stream of the head 10 to control the flow of fluid past the head 10. In response to the signal generated by the means 13, the motor means 15 move the vane means 16 to regulate the flow of fluid in the duct 11. Thus, the fluid flow meter head 10, by sensing a pressure related to the velocity pressure of the fluid flowing in the duct, can regulate the velocity pressure in the duct 11.

Generally, the fluid flow meter head 10, according to this invention, includes a single hollow tubular member 20 having a front chamber 30 and a rear chamber 31, a series of openings 35 from the front chamber 30 facing forwardly toward the direction of fluid flow, another series of openings 36 from the rear chamber 31 facing other than forwardly and other than toward the direction of fluid flow, mounting means 40 for mounting the flow meter head 10 in the path of fluid flow and fluid connecting means 45 for fluidly connecting the flow meter head to the means 13 for measuring differential fluid pressure. The fluid flow meter head 10 may include two sets of other openings 36, selecting means 50 for alternatively opening one of the sets of openings 36 into the rear chamber 31, and moving means 60 for moving the selecting means 50 between the sets of openings 36.

Referring now to FIG. 2 and 3, the single hollow tubular member 20 has a curved front wall 21 with a front surface 22, and oppositely curved rear wall 23 with a rear surface 24 which together define a hollow which is divided in half by a vertical center dividing wall 25. The member 20 also has a space pair of rearwardly extending walls 26 joined to the walls 21 and 23 at the juncture of these walls with each other. The rearwardly extending walls 26 are shown as being generally planar, but they could also be curved, preferrably outwardly.

It is contemplated that the hollow tubular member will be extruded out of plastic, metal, or other suitable material in standard length and if need be will be cut a desired length. The open ends of the hollow tubular member 20, are closed by end caps 27 secured by sheet metal screws 28 in grooves 29 formed in the walls 21 and 23.

The hollow tubular member 20 forms a front chamber 30 between the front wall 21 and the center dividing wall 25 and a rear chamber 31 between the rear walls 23 and the center dividing wall 25. An axially spaced series of opening 35 are provided through the front wall 21 from the front chamber 30 to the front surface 22 to open forwardly. An axially spaced series of opening 36 are provided through the rear wall 23 from the rear chamber 31 to the rear surface 24. Both series of opening 35 and 36 are so sized that the sum of their cross-sectional areas is less than the cross-sectional area of the chambers 30, 31 into which they open. The reasons for such a relationship are explained in my previous applications.

The mounting means 40 of the fluid flow meter head 10, are for mounting the hollow tubular member 20 transversely within the duct 11 across the flow of fluid therein, with the openings 35 facing the flow of fluid. The mounting means, of the preferred embodiment, include the provision of a pair of threaded holes 41 in each of the end caps 27 of the member 20. The pair of threaded holes 41 are suitably located in the end caps 27 so that one of the holes 41 opens to each of the chambers 30 and 31. The mounting means 40 also includes the provision of a threaded bolt 42 for each hole 41. The bolts 42 are sized to extend through holes in the duct wall and thread into the holes 41 to mount the member 20 to the wall to extend transversely across the duct 11.

The fluid connecting means 45 of the fluid flow meter head 10 are for fluidly connecting the head 10, after being mounted in the duct 11 to the means 13 for measuring differential fluid pressure. The fluid connecting means 45 of the preferred embodiment, includes the provision of a central bore 46 in each of the bolts 42 on one end of the member 20. The bore 46 extends from the head of the bolt 42 to the respective chamber 30 and 31. A T fitting 47 is inserted into the bores 46 of each of the bolts 42. One of the open ends of the T fitting 47 has received thereon one end of a hose 48, the other end of which is connected to the proper fitting of the means 13. The other open end of the T fitting 47 is normally plugged by an end plug 49, but this plug 49 is removable for receiving a hose from another differential fluid pressure sensing means 13 for cablibration or checking purposes.

The fluid flow meter head 10 will probably be constructed at a factory for each particular job, though it could be constructed at the job site itself. To construct the fluid flow meter head 10 at the factory, a length of the member 20 is cut from the extrusion thereof. The openings 35 and 36 are drilled or otherwise formed in the member 20. The end caps 27 are secured over the ends of the member 20 by screws 28. The head 10 is now ready to be shipped to the job site along with templets 12, bolts 42, T-fittings 47, hose 48 and plugs 49, for installation into a duct 11 at the job site.

At the job site, the templets 12 are applied onto the side of the duct 11 and mounting holes are drilled through these walls, as indicated by the templets. The fluid flow meter head 10, previously constructed, is inserted into the duct 11 and the threaded holes 41 aligned with the holes in the duct walls 11 to receive the bolts 42. If the flow meter head 10 as constructed at the factory is too long to fit into the duct 11, one end cap 27 is removed, the member 20 cut to length, and the end cap 27 is resecured to the member 20 by screws 28. Once the head 10 is mounted between the duct walls 11, the T-fittings 47, hoses 48 and plugs are assembled to complete the mounting of the head 10.

The mounting holes indicated by the templet 12 are so located on the duct 11, that when the head 10 is mounted in the duct 11, the series of openings 35 face the direction from which the fluid flows, whereby the chamber 30 sense the total pressure sensing chamber. The other series of openings 36 are either the vertical openings 37 which face across the flow of fluid whereby the chamber 31 senses the static pressure of the fluid and becomes a static pressure sensing chamber or are the rearward openings 38 which face rearwardly into a low pressure area created by and between the rearwardly extending walls 27 whereby the chamber 31 senses this low pressure which is linearly related to static pressure by a correction factor. These pressures are fed to the means 13 for measuring differential fluid pressure by the hoses 48 which read the difference between the two pressures sensed to provide either the velocity pressure of the fluid or a pressure which is linearly related to the velocity pressure of the fluid so as to provide an indication of the volumetric rate of fluid flow and to regulate the flow of fluid in the duct 11, as has been previously explained.

Many times the difference between the total pressure and the static pressure for low volumetric rates of air flow is too minimal to operate the means 13 for measuring differential fluid pressure, and so for effective operation of the means 13, and so this difference must be increased by a factor for which compensation may be made in the means 13. The openings 38 provide this increased difference linearly to simply and easily operate the means 12 for such uses.

In the preferred embodiment of the air flow meter head 10 heretofore described, the head 10 was provided with either the vertical openings 37 or the rearward openings 38 but not both sets of openings 36. For most jobs, the provision of one or the other of the openings 37 or 38 is sufficient and keeps the design and construction of the preferred embodiment simple and uncomplicated. However, for some jobs, it may be desirable for certain purposes, such as for calibration or checking of the means 12, to provide a flow meter head 10 which has both a set of vertical openings 37 and a set of rearward openings 38 which can be alternately opened to the chamber 31. A flow meter head 10 with both sets of openings 37 or 38 is provided in an alternative preferred embodiment which is shown in FIGS. 4 and 5.

In the fluid flow meter head 10, of the alternative preferred embodiment of this invention, the single hollow tubular member 20 is essentially the same as before, except that as best seen in FIG. 4, both types of the openings 36 i.e., a set of vertical openings 37 and a set of rearward openings 38 are provided in alternating relationship.

The alternative preferred embodiment of the fluid flow meter head 10 has selecting means 50 for selectively opening one set of openings 36 while closing the other set of openings 36. The selecting means 50 include the provision of upper and lower grooves 51 in the rear wall 23 and adjacent the center dividing wall 25 to open towards each other into the rear chamber 31. A U-shaped member 52 is located in each of the grooves 51 and has alternating cutouts 53 and solid portions 54 spaced corresponding to the spacing of the openings 37 and 38. The length of the member 52 is such that when the member 52 is against the left end cap 27, the cutouts 53 are aligned with the openings 37 while the solid portion 54 block the openings 38 and when the member 52 is against the right end cap 27, the cutouts 53 are aligned with the openings 38 while the solid portions 54 block the openings 37. The members 52 are provided with opposed grooves 55 which receive therein roller springs 56 which bias the members 52 apart, to keep them located in the grooves 51 of the member 20.

Moving means 60 are also provided with the alternative preferred embodiment for sliding the selecting means between its positions within the chamber 31 of the member 20. The moving means 60 include the provision of a notch 61 in each member 52 adjacent the right end thereof. A bar 62 extends between the notches 61 to lock the two members 52 together for movement. The bar 62 also has a centrally located aperture 63 which is aligned with the threaded hole 41 communicating with the rear chamber 31. The bolt 42 for the threaded opening 41 into the chamber 31, is elongated and provide with a circumferential groove 64 adjacent the inner end thereof which snappingly mates with the aperture 63 of the bar 62 to axially but not rotatably lock the bar 62, and the members 52 thereon, to the bolt 42. Upon rotation of the bolt 42, the threaded engagement of the bolt 42 with the end cap 27 moves the bolt 42 and the members 52 axially relative to the member 20 to move the members 52 between positions. The outer end of the bolt 42 is provided with an inner groove 65 which snappingly mates with an end 66 on the T-fitting 47 to mount the T-fitting 47 thereto and yet permit the relative rotation required to move the members 52 between the positions.

The fluid flow meter head 10 of the alternative embodiment is generally assembled as before except that the members 52, springs 53 and bear 54 must be inserted into the rear chamber 31 before the end caps 27 are secured to the member 20. The fluid flow member head 10 of the alternative embodiment is installed in the duct 11 generally as before except that the elongated bolt 42 must be turned inwardly until the inner end thereof has snapped into the aperature 63 of the bar 62.

Once the alternative embodiment of the fluid flow meter head 10 is installed, the elongated bolt 42 is turned until the members 52 bottom against the left end cap 27 to open the vertical openings 37 to the rear chamber 31 while closing the rearward openings 38 to thereby provide a static pressure sensing chamber 31. To change the static pressure sensing chamber 31 to a low pressure sensing chamber 31, the elongated bolt 42 is rotated until the members 52 engage the right end cap 27. In this position, the rearward openings 38 are opened to the chamber while the vertical openings 37 are blocked. The members 52 can be shifted between positions as many times as it needed.

Thus the fluid flow meter head 10 according to this invention provides a novel single head which is easily manufactured and installed to operate a means for measuring differential fluid pressure for controling the flow of fluid in a duct.

I claim:

1. An airflow meter head for fluid connection to a means for measuring differential fluid pressure to provide an indication of the velocity pressure for measuring fluid flow rate, comprising:
   a single hollow tubular member aving a wall dividing the hollow into two separate chambers, said member having a series of axially spaced openings from a first of said chambers through the member to open facing forwardly and having one or more openings from the second of said chambers through the member to open facing other than forwardly, the sum of the cross-sectional areas of each series of openings being less than the cross-sectional area of the chamber associated therewith, said tubular member being provided with a spaced pair of rearwardly extending walls for creating a low pressure area therebetween when the tubular member is located in the path of fluid flow;
   means mounting the member in the path of fluid flow, with the forwardly facing openings facing the flow of fluid to provide a total pressure sensing chamber, and with the other openings facing other than towards the flow of fluid to provide a low pressure sensing chamber; and
   means fluidly connecting each of said chambers to the measuring means.

2. The air flow meter head as in claim 1 wherein the openings facing other than forwardly, face rearwardly and open into the space between the rearwardly extending walls.

3. An airflow meter head for fluid connection to a means for measuring differential fluid pressure to provide an indication of the velocity pressure for measuring fluid flow rate, comprising:
   a single hollow tubular member having a wall dividing the hollow into two separate chambers, said member having a series of axially spaced openings from a first of said chambers through the member to open facing forwardly and having a series of axially spaced openings from the second of said chambers through the member to open facing other than forwardly, the sum of the cross-sectional areas of each series of openings being less than the cross-sectional area of the chamber associated therewith, said openings facing other than forwardly being provided in two sets, one set of openings facing rearwardly and the other set of openings facing other than forwardly and rearwardly, means provided in the second chamber for selectively opening one set to the chamber while closing the other set to the chamber;

means mounting the member in the path of fluid flow, with the forwardly facing openings facing the flow of fluid to provide a total pressure sensing chamber, and with the other openings facing other than towards the flow of fluid to provide a low pressure sensing chamber; and means fluidly connecting each of said chambers to the measuring means.

4. The air flow meter head as in claim 3 wherein the selecting means includes a generally U-shaped blocking member for insertion into the second chamber, said blocking member having cutouts therein which are aligned with the one set.

5. The air flow meter head as in claim 3 wherein the second chamber has oppositely opening, member-receiving, longitudinal grooves cut therein, wherein both sets of openings open into this groove, and wherein the selecting means includes slidable selecting members slidably located in these grooves, said selecting members having cutouts which may be aligned with either set of openings and includes moving means for sliding the selecting members to align the cutouts thereof with the desired set of openings.

6. The air flow meter head as in claim 5 wherein the slidable selecting member includes:

an elongated member located in each groove, and round springs between the elongated members for biasing the elongated members into the grooves.

7. The air flow meter head as in claim 5 wherein the sets of openings are axially spaced and alternating, and wherein the selecting members have alternating cutout portions and solid portions, sliding of the selecting members moving the cutout portions from alignment with one set to alignment with the other set while moving the solid portions from alignment with the other set to alignment with the one set.

* * * * *